United States Patent
Takahashi

(10) Patent No.: US 8,787,054 B2
(45) Date of Patent: Jul. 22, 2014

(54) ELECTRIC POWER CONVERSION APPARATUS

(75) Inventor: Nobuhiro Takahashi, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 218 days.

(21) Appl. No.: 13/422,597

(22) Filed: Mar. 16, 2012

(65) Prior Publication Data

US 2012/0170343 A1 Jul. 5, 2012

Related U.S. Application Data

(63) Continuation-in-part of application No. PCT/JP2009/004672, filed on Sep. 17, 2009.

(51) Int. Cl.
*H02M 3/24* (2006.01)

(52) U.S. Cl.
USPC .......................................... 363/132

(58) Field of Classification Search
USPC ................. 363/34, 35, 36, 37, 50, 51, 52, 55, 363/56.01, 56.02, 56.03, 56.04, 56.05, 363/106–109, 147, 98, 132
See application file for complete search history.

(56) References Cited

U.S. PATENT DOCUMENTS 5,982,645 A * 11/1999 Levran et al. .................... 363/37
2012/0300522 A1* 11/2012 Tokuyama et al. ............ 363/131

FOREIGN PATENT DOCUMENTS

| CN | 101110554 | 1/2008 |
|---|---|---|
| JP | 62-077875 | 4/1987 |
| JP | 2002-354840 | 12/2002 |
| WO | WO 00/19590 | 4/2000 |

OTHER PUBLICATIONS

International Preliminary Report on Patentability (Chapter I) issued by the International Bureau of WIPO on Sep. 17, 2009, for International Application No. PCT/JP2009/004672 (6 pages).
English-language International Search Report issued by the Japanese Patent Office in International Application No. PCT/JP2009/004672, mailed Dec. 22, 2009 (1 page).

* cited by examiner

*Primary Examiner* — Gary L Laxton
*Assistant Examiner* — Afework Demisse
(74) *Attorney, Agent, or Firm* — Finnegan, Henderson, Farabow, Garrett & Dunner, L.L.P.

(57) ABSTRACT

An electric power conversion apparatus comprises: three conversion units; a backup conversion unit that can be substituted for any one of the conversion units; and a backup terminal conductor unit. The conversion units, which are mounted on a converter board disposed in a case, can convert a DC current to a three-phase AC current having U-, V- and W-phases. If any one of the conversion units goes out of order, the backup terminal conductor unit can then electrically connect the auxiliary conversion unit, in substitution for the conversion unit having gone out of order, to a three-phase AC input/output unit.

6 Claims, 2 Drawing Sheets

ELECTRIC POWER CONVERSION APPARATUS

CROSS REFERENCES TO RELATED APPLICATIONS

This application is a continuation-in-part (CIP) application based upon the International Application PCT/JP2009/004672, the International Filing Date of which is Sep. 17, 2009, the entire content of which is incorporated herein by reference.

BACKGROUND ART

The present invention relates to an electric power conversion apparatus which allows short-time recovery from a partial failure.

Some electric power conversion apparatuses are used to convert a three-phase alternating current power source into a direct current power source to drive electric motors etc. On the other hand, there are other electric power conversion apparatuses which convert a direct current power source into a three-phase alternating current power source and supply the alternating current power source to an electric power system etc. Among known examples of such electric power conversion apparatuses is one disclosed in Japanese Patent Application Laid-Open Publications No. 2002-354840, the entire content of which is incorporated herein by reference.

An electric power conversion apparatus typically includes a U-phase conversion unit, a V-phase conversion unit, and a W-phase conversion unit which correspond to a three-phase alternating current. The U-phase conversion unit has the function of converting a direct current into a current component corresponding to a current component of a three-phase alternating current corresponding to a U phase, and the function of converting a U-phase current into a direct current. The V-phase conversion unit and the W-phase conversion unit each have similar functions to those of the U-phase conversion unit.

These conversion units are arranged inside a control panel or the like. The conversion units each may have leading parts or the like that are intended for easy insertion and extraction into/from the control panel. Such a configuration facilitates a recovery operation since a conversion unit corresponding to one phase, if failed, can be easily replaced with a replacement conversion unit. Wiring in the vicinity of the leading parts and the like is often complicated and high in cost. Complicated wiring can sometimes lower energization efficiency.

A U-phase conversion unit, a V-phase conversion unit, and a W-phase conversion unit are sometimes directly attached to a substrate that is arranged in a casing, for example. Such a configuration allows more compact arrangement of the conversion units. The absence of leading parts and the like can accordingly simplify the wiring for lower manufacturing costs.

If the conversion units are configured to be directly attached to a substrate or the like, it may take a long time to replace a failed conversion unit. Electric power conversion apparatuses are often used to drive plant and other equipment such as electric motors, and can rarely be stopped for a long time. A failure recovery operation therefore needs to be performed in a short time.

BRIEF SUMMARY OF THE INVENTION

The present invention has been achieved in order to solve the foregoing problem, and it is an object thereof to restore a failed electric power conversion apparatus in a short time.

In order to achieve the object described above, there is presented an electric power conversion apparatus comprising: a casing; a converter substrate that is arranged in the casing; a first phase conversion unit that is attached to the converter substrate and is configured to be capable of converting a direct current into a first phase current component of a three-phase alternating current; a second phase conversion unit that is attached to the converter substrate and is configured to be capable of converting the direct current into a second phase current component of the three-phase alternating current; a third phase conversion unit that is attached to the converter substrate and is configured to be capable of converting the direct current into a third phase current component of the three-phase alternating current; a backup phase conversion unit that is configured to be capable of replacing each of the first phase conversion unit, the second phase conversion unit, and the third phase conversion unit; a three-phase alternating current unit that is electrically connected to each of the first phase conversion unit, the second phase conversion unit, and the third phase conversion unit, and is capable of outputting a three-phase alternating current; a direct current unit that is electrically connected to each of the first phase conversion unit, the second phase conversion unit, and the third phase conversion unit, and is capable of inputting a direct current; and a backup terminal conductor unit that is arranged at a distance from each of the first phase conversion unit, the second phase conversion unit, and the third phase conversion unit, is electrically connected to the backup phase conversion unit, and is configured to be capable of electrically connecting the backup phase conversion unit to the three-phase alternating current unit instead of any one of the first phase conversion unit, the second phase conversion unit, and the third phase conversion unit when the one fails.

There is also presented an electric power conversion apparatus comprising: a casing; a converter substrate that is arranged in the casing; a first phase conversion unit that is attached to the converter substrate and is configured to be capable of converting a first phase current component of a three-phase alternating current into a direct current; a second phase conversion unit that is attached to the converter substrate and is configured to be capable of converting a second phase current component of the three-phase alternating current into a direct current; a third phase conversion unit that is attached to the converter substrate and is configured to be capable of converting a third phase current component of the three-phase alternating current into a direct current; a backup phase conversion unit that is configured to be capable of replacing each of the first phase conversion unit, the second phase conversion unit, and the third phase conversion unit; a three-phase alternating current unit that is electrically connected to each of the first phase conversion unit, the second phase conversion unit, and the third phase conversion unit, and is capable of inputting a three-phase alternating current; a direct current unit that is electrically connected to each of the first phase conversion unit, the second phase conversion unit, and the third phase conversion unit, and is capable of outputting a direct current; and a backup terminal conductor unit that is arranged at a distance from each of the first phase conversion unit, the second phase conversion unit, and the third phase conversion unit, is electrically connected to the backup phase conversion unit, and is configured to be capable of electrically connecting the backup phase conversion unit to the three-phase alternating current unit instead of any one of the first phase conversion unit, the second phase conversion unit, and the third phase conversion unit when the one fails.

According to the present invention, it is possible to restore a failed electric power conversion apparatus in a short time.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION

Figure 1:
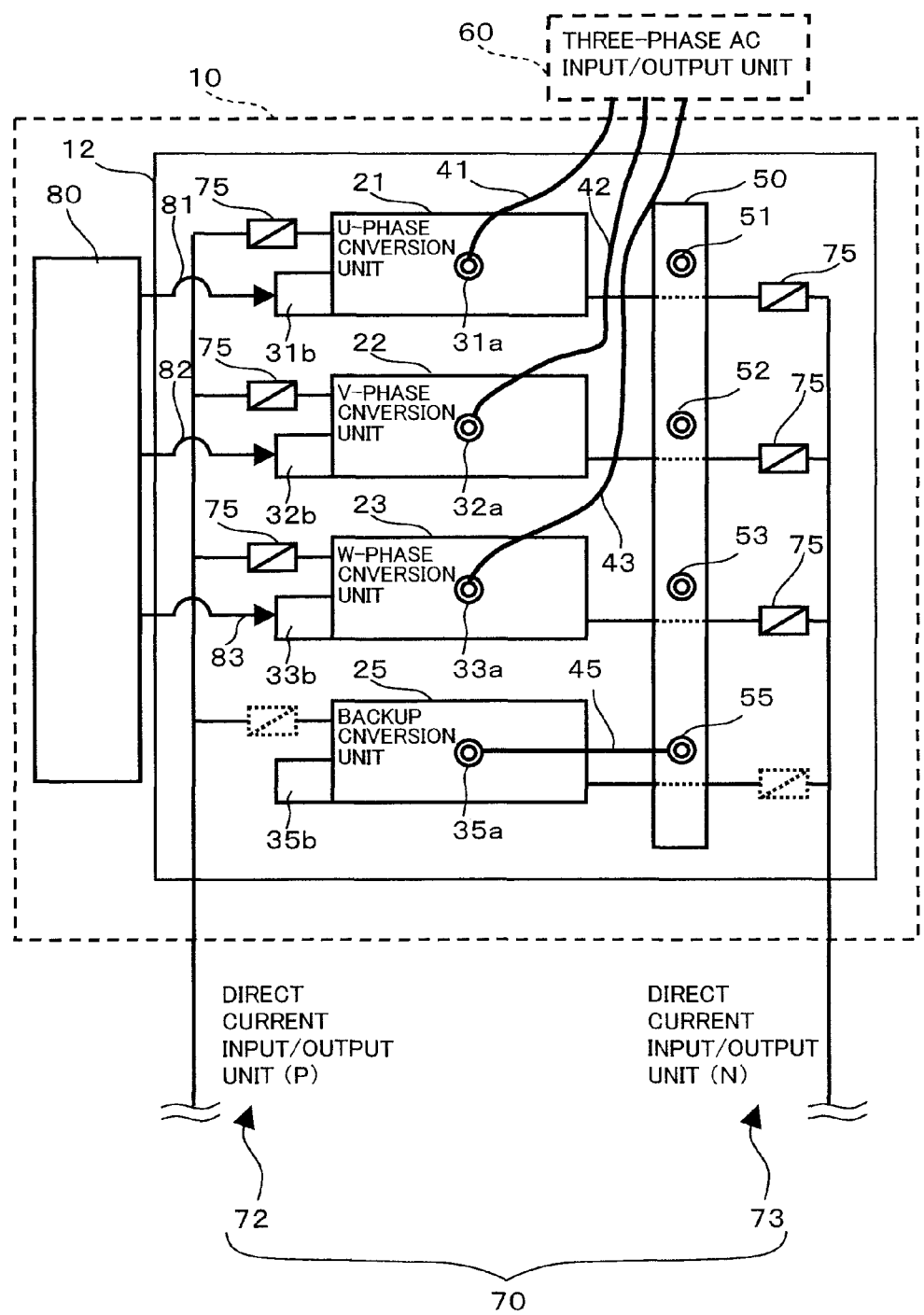
FIG. 1 is a block diagram showing the configuration of an electric power conversion apparatus according to an embodiment of the present invention.
Figure 2:
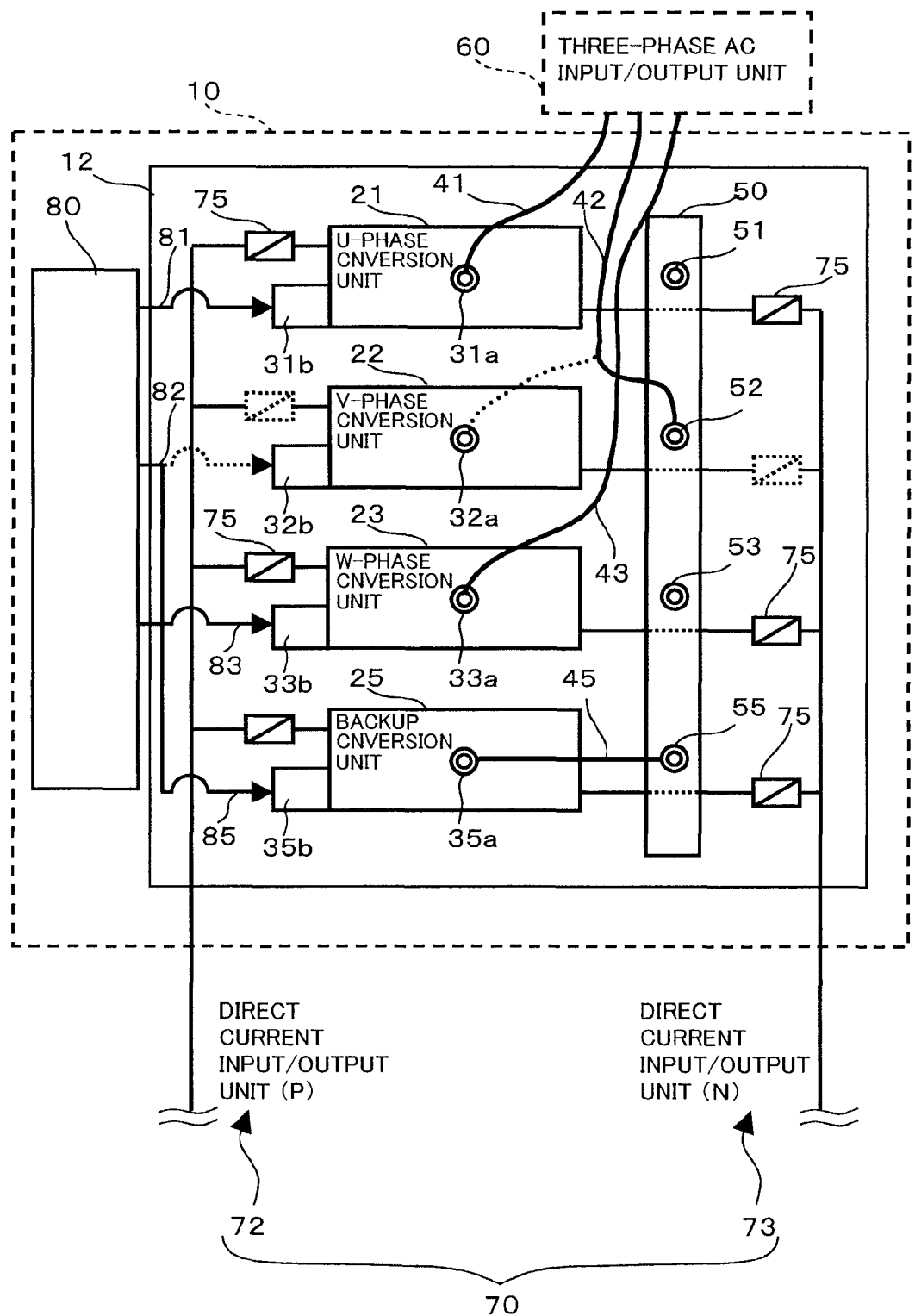
FIG. 2 is a block diagram showing a state of recovery when a V-phase conversion unit of the electric power conversion apparatus of FIG. 1 is failed.

An embodiment of the electric power conversion apparatus according to the present invention will be described below with reference to FIGS. 1 to 2. FIG. 1 is a block diagram showing the configuration of an electric power conversion apparatus according to the present embodiment. FIG. 2 is a block diagram showing a state of recovery when a V-phase conversion unit 22 of the electric power conversion apparatus of FIG. 1 is failed.

Initially, the configuration of the electric power conversion apparatus according to the present embodiment will be described.

As shown in FIG. 1, the electric power conversion apparatus according to the present embodiment includes: a casing 10; a converter substrate 12 which is arranged in the casing 10; a three-phase alternating current input/output unit 60; a direct current input/output unit 70; and three conversion units that are attached to the converter substrate 12 and correspond to a three-phase alternating current. The three conversion units are a U-phase conversion unit 21, a V-phase conversion unit 22, and a W-phase conversion unit 23.

The electric power conversion apparatus further includes: a control substrate 80 which controls each of the conversion units 21, 22, and 23; a backup conversion unit 25 which is configured to be capable of replacing each of the conversion units 21, 22, and 23; and a backup terminal conductor unit 50 which is electrically and mechanically connected to the backup conversion unit 25.

An example of the converter substrate 12 is a rectangular plate, which is erected and fixed inside the casing 10. The foregoing four conversion units are vertically arranged at intervals from each other and attached to the converter substrate 12 along the vertical direction.

The U-phase conversion unit 21 has the function of converting a direct current into a current component corresponding to a current component of a three-phase alternating current corresponding to a U phase, and the function of converting a U-phase current into a direct current. The V-phase conversion unit 22 has the function of converting a direct current into a current component corresponding to a V phase, and the function of converting a V-phase current into a direct current. Similarly, the W-phase conversion unit 23 has the function of converting a direct current into a current component corresponding to a W phase, and the function of converting a W-phase current into a direct current.

Description will be omitted of the detailed configuration of each of the U-phase conversion unit 21, the V-phase conversion unit 22, and the W-phase conversion unit 23, which are constituted by mounting electric parts such as a thyristor on a horizontally-long rectangular substrate. In this example, the conversion units 21, 22, and 23 are attached to the converter substrate 12 with their longitudinal direction horizontal.

The U-phase conversion unit 21 includes a U-phase gate unit 31b. The control substrate 80 and the U-phase gate unit 31b are connected through U-phase control signal wiring 81 so as to be capable of communication with each other. Similarly, the V-phase conversion unit 22 and the W-phase conversion unit 23 include a V-phase gate unit 32b and a W-phase gate unit 33b, respectively. The V-phage gate unit 32b and the W-phase gate unit 33b are connected with the control substrate 80 through V-phase control signal wiring 82 and W-phase control signal wiring 83, respectively, so as to be capable of communication with each other.

The conversion units 21, 22, and 23 have a U-phase terminal 31a, a V-phase terminal 32a, and a W-phase terminal 33a, respectively, to which a U-phase cable 41, a V-phase cable 42, and a W-phase cable 43 to be described later can be electrically and mechanically connected, respectively.

The control substrate 80 is configured so that it can transmit control signals such as an ON/OFF command to each of the U-phase conversion unit 21, the V-phase conversion unit 22, and the W-phase conversion unit 23 through the U-phase gate unit 31b, the V-phase gate unit 32b, and the W-phase gate unit 33b, respectively.

The three-phase alternating current input/output unit 60 is arranged inside the casing 10 and outside the converter substrate 12, and is configured to be capable of connection with outside the casing 10.

The U-phase terminal 31a of the U-phase conversion unit 21 and the three-phase alternating current input/output unit 60 are electrically and mechanically connected to each other by the U-phase cable 41. Here, an end of the U-phase cable 41 on the conversion unit side and the U-phase terminal 31a are electrically and mechanically connected to each other in a detachable manner. The other end of the U-phase cable 41, i.e., the end on the side of the three-phase alternating current input/output unit 60 is electrically connected and attached to the three-phase alternating current input/output unit 60.

Like the U-phase conversion unit 21, the V-phase conversion unit 22 and the W-phase conversion unit 23 are electrically connected with the three-phase alternating current input/output unit 60 by the V-phase cable 42 and the W-phase cable 43, respectively. Here, the V-phase conversion unit 22 and the W-phase conversion unit 23 are connected to the V-phase cable 42 and the W-phase cable 43 in a detachable manner, respectively.

The lengths of the U-phase cable 41, the V-phase cable 42, and the W-phase cable 43 are each determined to be optimum when assembling the electric power conversion apparatus.

The direct current input/output unit 70 includes a P-side input/output unit 72 and an N-side input/output unit 73. The P-side and N-side input/output units 72 and 73 both are arranged inside the casing 10 and outside the converter substrate 12, and are configured to be capable of connection with outside the casing 10. In the example of FIG. 1, the P-side and N-side both are arranged to the bottom.

The P-side input/output unit 72 is connected to the converter substrate 12, and is electrically connected to each of the U-phase conversion unit 21, the V-phase conversion unit 22, and the W-phase conversion unit 23 by wiring formed on the converter substrate 12 through fuses 75 or the like. Similarly, the N-side input/output unit 73 is connected to the converter substrate 12, and is electrically connected to each of the U-phase conversion unit 21, the V-phase conversion unit 22, and the W-phase conversion unit 23 by wiring formed on the converter substrate 12 through fuses 75 or the like.

Although omitted in FIG. 1, the P-side input/output unit 72 and the N-side input/output unit 73 are also configured to be capable of electrical connection with the backup conversion unit 25. When the U-phase conversion unit 21, the V-phase conversion unit 22, and the W-phase conversion unit 23 are in a normal condition, fuses 75 or the like are detached so that the backup conversion unit 25 is electrically disconnected from both the P-side input/output unit 72 and the N-side input/output unit 73. To electrically connect the backup conversion unit 25 to both the P-side input/output unit 72 and the N-side input/output unit 73, fuses 75 or the like are attached to allow energization.

When the electric power conversion apparatus is used to convert a three-phase alternating current power source into a direct current power source, a three-phase alternating current power supply unit (not shown) is connected to the three-phase alternating current input/output unit 60, whereby an alternating current is transmitted from the three-phase alternating current input/output unit 60 to each of the U-phase conversion unit 21, the V-phase conversion unit 22, and the W-phase conversion unit 23. The conversion units 21, 22, and 23 each convert the alternating current into a direct current, which is output from the direct current input/output unit 70 as a direct current power source. This direct current power source is used, for example, to drive an electric motor (not shown) or the like which is installed in a plant.

Now, when the electric power conversion apparatus is used to convert a direct current power source into a three-phase alternating current power source, a direct current power supply unit (not shown) is connected to the direct current input/output unit 70. The direct current transmitted from the direct current input/output unit 70 is branched by wiring or the like formed on the converter substrate 12, and transmitted to each of the U-phase conversion unit 21, the V-phase conversion unit 22, and the W-phase conversion unit 23. The direct currents transmitted to the conversion units 21, 22, and 23 are converted into alternating currents by the respective conversion units 21, 22, and 23, transmitted to the three-phase alternating current input/output unit 60, and output as a three-phase alternating current power source. The three-phase alternating current power source is supplied to a power system (not shown) or the like.

As mentioned above, the backup conversion unit 25 is configured to be capable of replacing each of the conversion units 21, 22, and 23. More specifically, when any one of the U-phase conversion unit 21, the V-phase conversion unit 22, and the W-phase conversion unit 23 fails, the backup conversion unit 25 can replace the failed conversion unit.

Like the U-phase conversion unit 21 etc., the backup conversion unit 25 includes a backup phase gate unit 35b. The backup phase gate unit 35b is configured to be capable of mutual communication with the control substrate 80. The backup conversion unit 25 also includes a backup phase terminal 35a to which a backup conversion unit cable 45 to be described later can be electrically and mechanically connected. The backup conversion unit cable 45 is constantly connected to the backup phase terminal 35a.

The backup terminal conductor unit 50 is attached to the converter substrate 12 and arranged at a distance from each of the U-phase conversion unit 21, the V-phase conversion unit 22, the W-phase conversion unit 23, and the backup conversion unit 25.

The backup terminal conductor unit 50 is a long plate-like member that is made of a conductor such as a copper alloy and extends in the vertical direction. The long plate-like conductor has four terminals, including a U-phase backup terminal 51, a V-phase backup terminal 52, a W-phase backup terminal 53, and a constant connection terminal 55.

The U-phase backup terminal 51 is configured so that the conversion unit-side end of the U-phase cable 41 can be electrically and mechanically connected. The V-phase backup terminal 52 and the W-phase backup terminal 53 are configured so that the conversion unit-side ends of the V-phase cable 42 and the W-phase cable 43 can be electrically and mechanically connected, respectively. When the conversion units 21, 22, and 23 are in a normal condition, none of the cables are connected to the U-phase backup terminal 51, the V-phase backup terminal 52, or the V-phase backup terminal 53.

The U-phase conversion unit 21, the V-phase conversion unit 22, the W-phase conversion unit 23, and the backup conversion unit 25 are vertically arranged at intervals from each other along the longitudinal direction of the backup terminal conductor unit 50. The U-phase backup terminal 51 is located within the reach of the conversion unit-side end of the U-phase cable 41 which is connected to the U-phase terminal 31a formed on the U-phase conversion unit 21. This eliminates the need to extend the U-phase cable 41 when switching connection of the U-phase cable 41 from the U-phase terminal 31 a to the U-phase backup terminal 51. Similarly, the V-phase backup terminal 52 and the W-phase backup terminal 53 are located within the reach of the conversion unit-side ends of the V-phase cable 42 and the W-phase cable 43, respectively.

The constant connection terminal 55 is electrically and mechanically connected to the background conversion unit 25 constantly by the backup conversion unit cable 45.

Next, the operation of the present embodiment will be described for a case where the V-phase conversion unit 22 fails.

When the V-phase conversion unit 22 failed, information on the failure is transmitted to a management center (not shown) or the like. Receiving the information, the management center or the like sends a maintenance operator to the installation site of the electric power conversion apparatus that includes the failed unit.

A procedure for the recovery of the V-phase conversion unit 22 will be described below.

Initially, the maintenance operator checks for the absence of current supply. Then, as shown in FIG. 2, the maintenance operator detaches the fuse 75 that is interposed between the V-phase conversion unit 22 and the P-side input/output unit 72.

Next, the maintenance operator detaches the V-phase cable 42 from the V-phase terminal 32a, and the maintenance operator connects the V-phase cable 42 to the V-phase backup terminal 52 which is formed on the backup terminal conductor unit 50. Subsequently, the maintenance operator attaches fuses 75 or the like so that both the P-side input/output unit 72 and the N-side input/output unit 73 are electrically connected with the backup conversion unit 25.

Next, the maintenance operator disconnects the communication of the V-phase control signal wiring 82 which is connected to the V-phase gate unit 32b so as to be capable of communication. Then, the maintenance operator establishes connection between the control substrate 80 and the backup conversion unit 25 by using backup control signal wiring 85.

By the foregoing procedure, the recovery operation in the event of a failure of the V-phase conversion unit 22 is completed. The conversion units other than the V-phase conversion unit 22, if failed, can be recovered by a similar procedure.

As can be seen from the foregoing procedure, according to the present embodiment, quick recovery is possible without complicated wiring operations when any one of the U-phase conversion unit 21, the V-phase conversion unit 22, and the W-phase conversion unit 23 fails.

The present embodiment is applicable both when converting a three-phase alternating current power source into a direct current power source and when converting a direct current power source into a three-phase alternating current power source.

The description of the present embodiment has been given for illustrative purposes in order to describe the present invention, and is by no means to limit the inventions set forth in the claims. The configuration of the components of the present invention is not limited to the foregoing embodiment, and various modifications may be made within the technical scope set forth in the claims.

For example, while the backup terminal conductor unit 50 of the present embodiment includes the backup terminals 51, 52, and 53 which are dedicated to the respective phases, such a configuration is not restrictive. Since the V-phase cable 42 can be electrically and mechanically connected to the U-phase backup terminal 51, the U-phase backup terminal 51 may be shared between the U-phase and V-phase.

What is claimed is:

1. An electric power conversion apparatus comprising:
   a casing;
   a converter substrate that is arranged in the casing;
   a first phase conversion unit that is attached to the converter substrate and is configured to be capable of converting a direct current into a first phase current component of a three-phase alternating current;
   a second phase conversion that is attached to the converter substrate and is configured to be capable of converting the direct current into a second phase current component of the three-phase alternating current;
   a third phase conversion unit that is attached to the converter substrate and is configured to be capable of converting the direct current into the third phase current component of the three-phase alternating current;
   a backup phase conversion unit that is configured to be capable of replacing each of the first phase conversion unit, the second phase conversion unit, and the third phase conversion unit;
   a three-phase alternating current unit that is electrically connected to each of the first phase conversion unit, the second phase conversion unit, and the third phase conversion unit, and is capable of outputting a three-phase alternating current;
   a direct current unit that is electrically connected to each of the first phase conversion unit, the second phase conversion unit, and the third phase conversion unit, and is capable of inputting a direct current; and
   a backup terminal conductor unit that is that is arranged at a distance from each of the first phase conversion unit, the second phase conversion unit, and the third phase conversion unit, is electrically connected to the backup phase conversion unit, and is configured to be capable of electrically connecting the backup phase conversion unit to the three-phase alternating current unit instead of any one of the first phase conversion unit, the second phase conversion unit, and the third phase conversion unit when the one fails, wherein:
   a backup cable having an electrical conductivity is mechanically and electrically connected at one end to the backup phase conversion unit, and is mechanically and electrically connected at another end to the backup terminal conductor unit;
   a first phase cable, a second phase cable, and a third phase cable having an electrical conductivity are electrically and mechanically connected to the three-phase alternating current unit at their respective three-phase alternating current unit-side ends;
   converter-side ends of the first phase cable, the second phase cable, and the third phase cable are electrically and mechanically connected to the first phase conversion unit, the second phase conversion unit, and the third phase conversion unit in a detachable manner, respectively; and
   when any one of the first phase conversion unit, the second phase conversion unit, and the third phase conversion unit fails, the converter-side end of one of the first phase cable, the second phase cable, and the third phase cable corresponding to the failed conversion unit is detached from the failed conversion unit and electrically and mechanically connected to the backup terminal conductor unit.

2. The electric power conversion apparatus according to claim 1, wherein:
   the backup terminal conductor unit includes a plurality of terminal parts; and
   when any one of the first phase conversion unit, the second phase conversion unit, and the third phase conversion unit fails, one of the first phase cable, the second phase cable, and the third phase cable corresponding to the failed conversion unit is connected to the terminal parts without extension.

3. The electric power conversion apparatus according to claim 1, wherein the backup terminal conductor unit is made of copper or a copper alloy.

4. An electric power conversion apparatus comprising:
   a casing
   a converter substrate that is arranged in the casing;
   a first phase conversion unit that is attached to the converter substrate and is configured to be capable of converting first phase current component of a three-phase alternating current into a direct current;
   a second phase conversion unit that is attached to the converter substrate and is configured to be capable of converting a second phase current component of the three-phase alternating current into a direct current;
   a third phase conversion unit that is attached to the converter substrate and is configured to be capable of converting a third phase current component of the three-phase alternating current into a direct current;
   a backup phase conversion unit that is configured to be capable of replacing each of the first phase conversion unit, the second phase conversion unit, and the third phase conversion unit;
   a three-phase alternating current unit that is electrically connected to each of the first phase conversion unit the second phase conversion unit, the third phase conversion unit, and is capable of inputting a three-phase alternating current;
   a direct current unit that is electrically connected to each of the first phase conversion unit, the second phase conversion unit, and the third phase conversion unit, and is capable of outputting a direct current; and
   a backup terminal conductor unit that is arranged at a distance from each of the first phase conversion unit, the second phase conversion unit and the third phase conversion unit, is electrically connecting the backup phase conversion unit, and is configured to be capable of electrically connecting the backup phase conversion unit to the three-phase alternating current unit instead of any one of the first phase conversion unit, the second phase conversion unit and the third phase conversion unit when the one fails, wherein:
a backup cable having an electrical conductivity is mechanically and electrically connected at one end to the backup phase conversion unit, and is mechanically and electrically connected at another end to the backup terminal conductor unit;
a first phase cable, a second phase cable, and a third phase cable having an electrical conductivity are electrically and mechanically connected to the three-phase alternating current unit at their respective three-phase alternating current unit-side ends;
converter-side ends of the first phase cable, the second phase cable, and the third phase cable are electrically and mechanically connected to the first phase conversion unit, the second phase conversion unit, and the third phase conversion unit in a detachable manner, respectively; and
when any one of the first phase conversion unit, the second phase conversion unit, and the third phase conversion unit fails, the converter-side end of one of the first phase cable, the second phase cable, and the third phase cable corresponding to the failed conversion unit is detached from the failed conversion unit and electrically and mechanically connected to the backup terminal conductor unit.

5. The electric power conversion apparatus according to claim 4, wherein:
the backup terminal conductor unit includes a plurality of terminal parts; and
when any one of the first phase conversion unit, the second phase conversion unit, and the third phase conversion unit fails, one of the first phase cable, the second phase cable, and the third phase cable corresponding to the failed conversion unit is connected to the terminal parts without extension.

6. The electric power conversion apparatus according to claim 4, wherein the backup terminal conductor unit is made of copper or a copper alloy.

* * * * *